Feb. 6, 1934. F. SLAVEK 1,946,179
AUTOMATIC POWER TRANSMISSION MEANS
Filed March 3, 1932 7 Sheets-Sheet 3

Fig.3.

Inventor
FREDERICK SLAVEK
By Clarence A. O'Brien
Attorney

Feb. 6, 1934.  F. SLAVEK  1,946,179
AUTOMATIC POWER TRANSMISSION MEANS
Filed March 3, 1932  7 Sheets-Sheet 4

Inventor

FREDERICK SLAVEK.

By *Clarence A. O'Brien*
Attorney

Feb. 6, 1934.  F. SLAVEK  1,946,179
AUTOMATIC POWER TRANSMISSION MEANS
Filed March 3, 1932  7 Sheets-Sheet 5

Inventor
Frederick Slavek
By Clarence A. O'Brien
Attorney

Feb. 6, 1934.   F. SLAVEK   1,946,179
AUTOMATIC POWER TRANSMISSION MEANS
Filed March 3, 1932   7 Sheets-Sheet 6

Inventor
Frederich Slavek
By Clarence A. O'Brien
Attorney

Feb. 6, 1934.  F. SLAVEK  1,946,179

AUTOMATIC POWER TRANSMISSION MEANS

Filed March 3, 1932  7 Sheets-Sheet 7

Inventor

FREDERICK SLAVEK.

By Clarence A. O'Brien
Attorney

Patented Feb. 6, 1934

1,946,179

UNITED STATES PATENT OFFICE 1,946,179

AUTOMATIC POWER TRANSMISSION MEANS

Frederick Slavek, New York, N. Y.

Application March 3, 1932. Serial No. 596,634

5 Claims. (Cl. 74—59)

This invention relates to automatic power transmission means for automobiles and the like, the general object of the invention being to provide automatic means for changing the gear ratios in accordance with the resistance offered by the driven shaft.

Another object of the invention is to provide means for preventing the clashing of the gears.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

In these drawings, the numeral 1 indicates the casing which is provided with a detachable cover 2 and the numeral 3 indicates the drive shaft which extends into one end of the casing and said end within the casing is formed with an exterior gear 4 and an internal clutch part 5. The driven shaft 6 extends through the other end of the casing where it is provided with an external gear 7 and a hollow part 10 having the internal spiral clutch teeth 11 thereon and the external spiral teeth 12 thereon. A splined shaft 13 has its ends fitting in the gears 4 and 7, said ends being supported by the roller bearings 14 and 15 and the numeral 16 indicates a hollow shaft splined to the shaft 13 for sliding movement thereon, and said shaft 16 carries the spiral gears 17, 18 and 19, the latter one 19 forming a clutch part.

Figure 1:
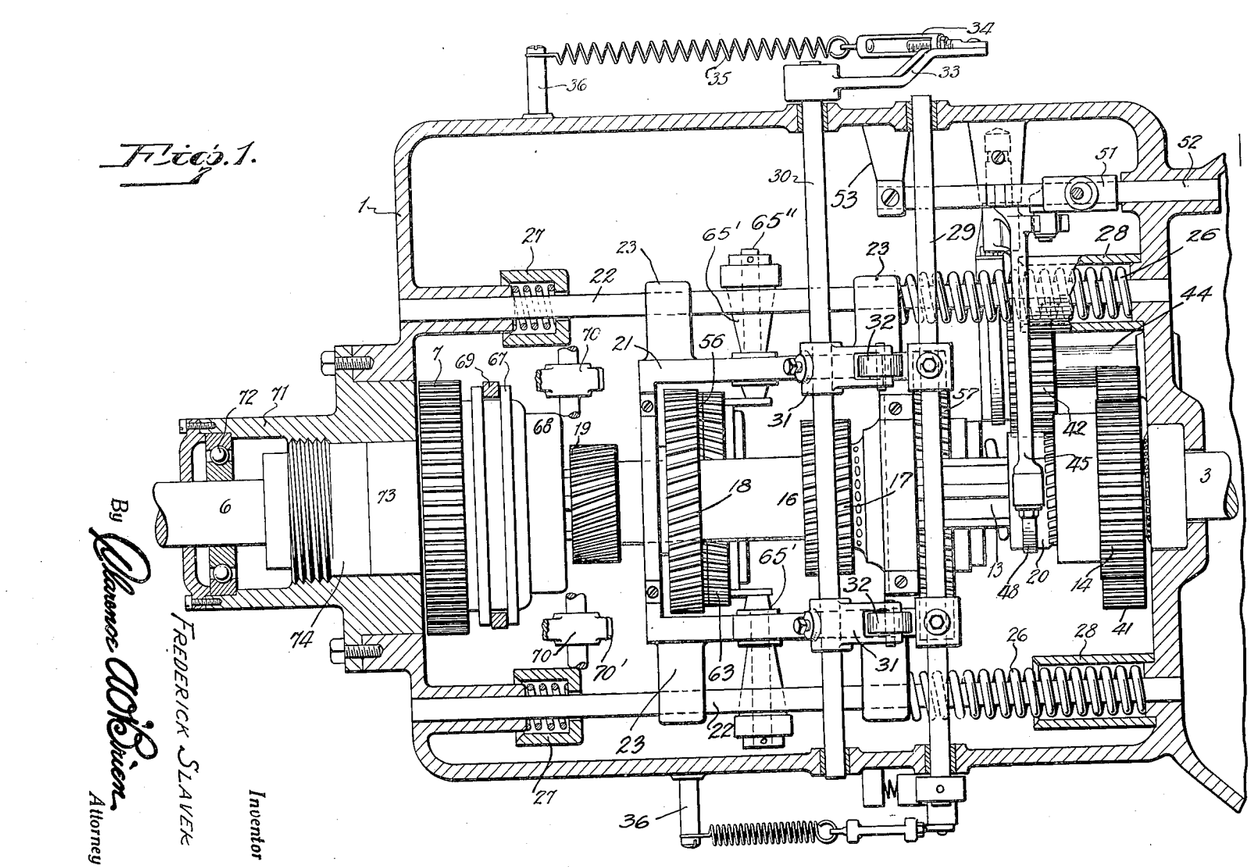
Figure 1 is a horizontal sectional view through the invention.
Figure 2:
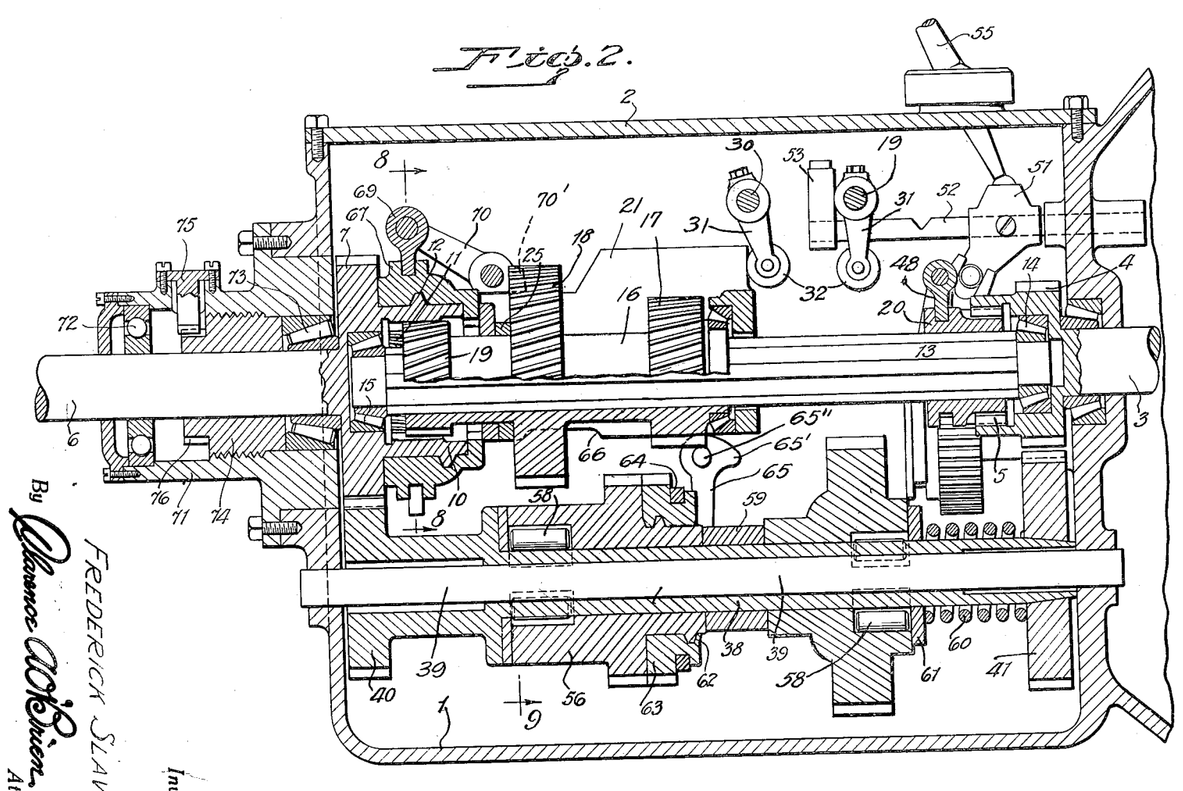
Fig. 2 is a vertical sectional view showing of the parts in high speed position.
Figure 3:
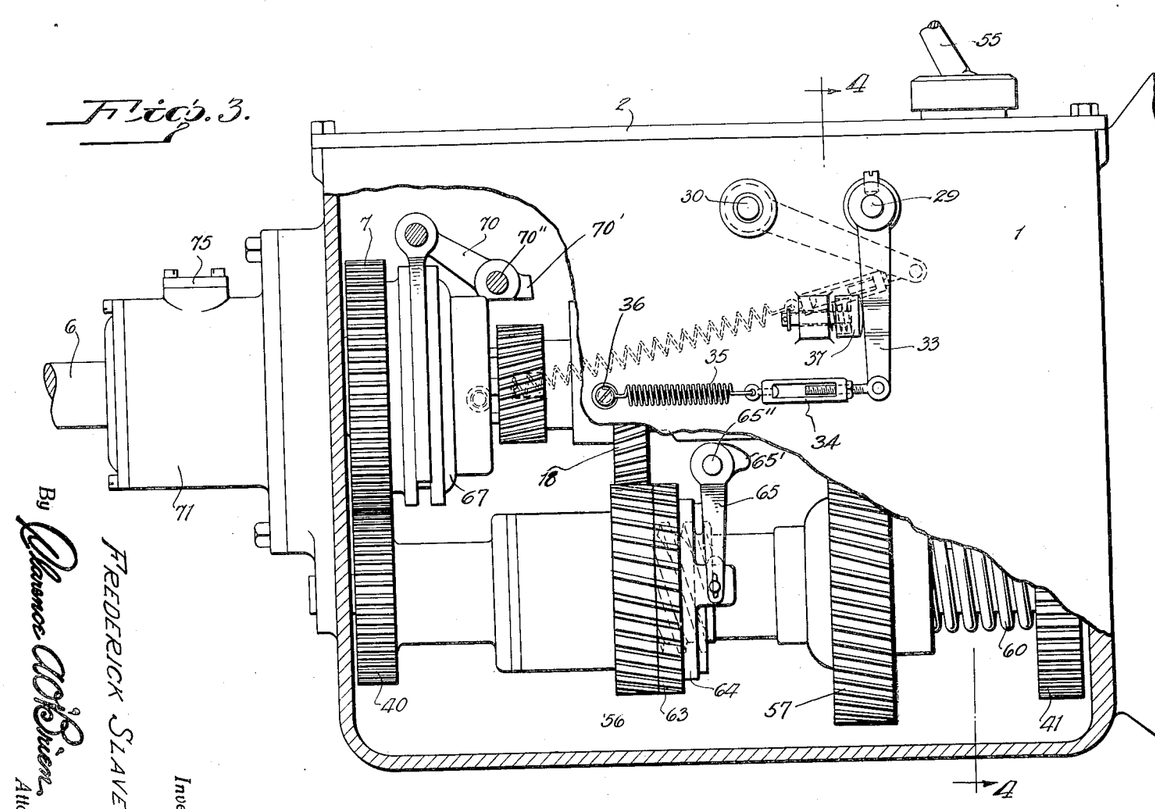
Fig. 3 is an elevation with parts of the case broken away and the gears in second speed position.
Figure 4:
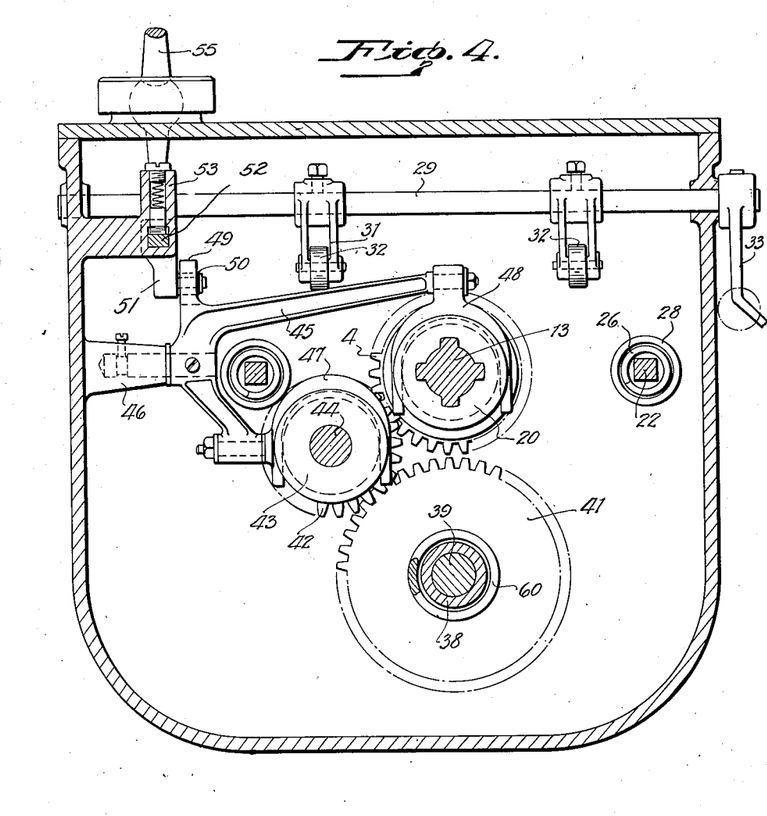
Fig. 4 is a section on line 4—4 of Fig. 3.
Figure 5:
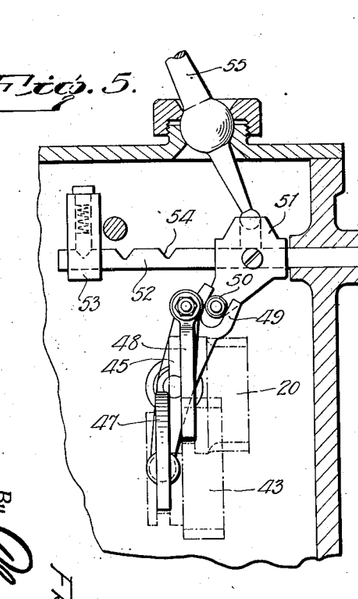
Fig. 5 is a detail sectional view showing the shifting means.

A clutch 20 is splined to the forward end of the shaft 13 and carries a toothed part for engaging the clutch teeth 5 of the shaft 3 for connecting the drive shaft 3 with the splined shaft 13 when said clutch 20 moves from a neutral position to the position it occupies in Fig. 2. It will of course be understood that when the shaft 13 is rotated by the shaft 3, the hollow shaft 16 with its gears 17, 18 and clutch part 19 will also be rotated.

A frame-like carriage 21 is supported for sliding movement on the longitudinally extending bars 22 in the casing by means of the projections 23 on the carriage having holes therein through which the bars 22 pass. The forward end of the carriage carries the roller bearing 24 for the front end of the shaft 16 and the rear end of the carriage carries the bushing 25 through which the rear part of the shaft 16 passes.

As will be seen, movement of this carriage will impart a longitudinal movement to the shaft 16 and its gears. Springs 26 are located on the forward ends of the rods 22 and tend to hold the carriage in rearward position with the clutch part 19 in mesh with the internal clutch part 11 of the part 10 of the driven shaft 6. Spring bumpers shown generally at 27 take up shock in this rearward movement of the carriage, these bumpers being located at the rear of the rods and tubular parts 28 encircle the front ends of the springs 26 and act as means for limiting the forward movement of the carriage.

A pair of transverse rods 29 and 30 pass through the casing and are supported for rotary movement, and each rod carries a number of arms 31 having rollers 32 at the free ends for engaging recesses 21' in the front end of the carriage and one of these rods has an end projecting from one side of the casing and the other rod has an end projecting from the opposite side thereof. An arm 33 is connected to each of the projecting ends, and each arm is connected by a turn buckle 34 with a spring 35 attached to the casing by the post 36. These springs tend to hold the rods in a position with the rollers 32 against the carriage. The shaft 29 and its associated parts help the springs 26 to hold the carriage in intermediate speed position and the shaft 30 and its associated parts helps the springs 26 to hold the carriage in its rearmost or high speed position.

A spring bumper 37 acts to limit the downward movement of each arm. A counter shaft 38 of hollow construction is rotatably arranged on the stationary shaft 39 which has its ends passing through holes in the ends of the casing and the rear end of the shaft 38 is formed with a gear 40 which meshes with the gear 7. The front end of the counter shaft 38 carries a gear 41 which is in alinement with the exterior gear 4 of the shaft 3 and when a gear 42 is moved into mesh with these gears 4 and 41, the shaft 6 will be rotated in a reverse direction from the shaft 3 through the gear 4, gear 42, gear 41, counter shaft 38 and gears 40 and 7.

It will of course be understood that when this reverse movement is taking place, the clutch 20 is out of engagement with the clutch teeth 5. The gear 42 is provided with a grooved part 43 and is slidably arranged on a shaft 44 and a two-armed member 45 has a stem rotatably arranged in a bearing member 46 in the casing. One arm of this member carries a fork 47 for engaging the groove in the member 43 of gear 42, and the other arm carries a fork 48 which engages the groove in the clutch member 20. The member 45 has an upwardly extending fork 49 thereon which is engaged by a roller 50 on a block 51 fastened to a sliding shaft 52 which passes through a detent carrying member 53 and has notches 54 therein for engagement by the detent so as to yieldingly hold the parts in any one of three positions.

It will of course be understood that in one position, both clutch 20 and gear 42 are in neutral position and out of mesh with their coacting parts, and in another position of the parts, the gear 42 will be in mesh with the gears 4 and 41 to produce a reverse movement of the driven shaft 6 from the drive shaft 3, and in another position the teeth of the member 20 will be in engagement with the clutch teeth 5 so as to connect the splined shaft 13 with the shaft 3. The block 51 is shifted through means of the shift lever 55.

Figure 13:
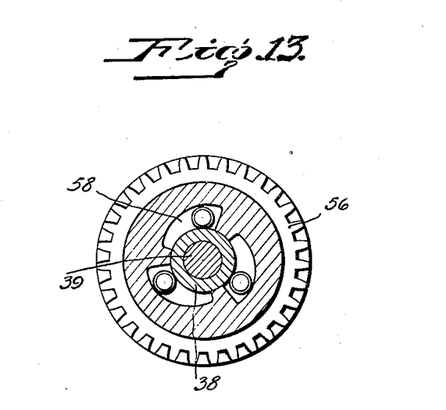
Figure 13 is a section on line 13—13 of Figure 7.
Figure 14:
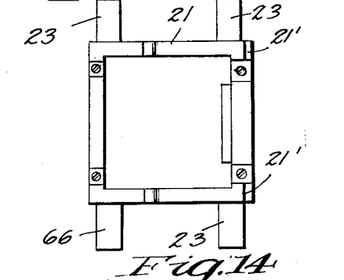
Figure 14 is a plan view of the carriage.
Figure 16:
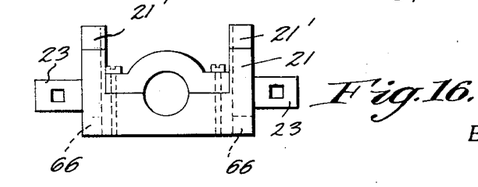
Figure 16 is an end view thereof.

The counter shaft 38 has the intermediate spiral gear 56 rotatably arranged thereon and also the low speed spiral gear 57 is rotatably arranged thereon. Each of these gears 56 and 57 are provided with the overrun clutch means shown generally at 58, see Fig. 13, so that they will only rotate the shaft 38 when rotated in one direction. A spacer 59 is placed between the hubs of these gears and a spring 60 on the counter shaft bears against the gear 41 and a part 61 of the gear 57 and acts to press the parts against the hub of the gear 40. Thus if the teeth of either gear 17 or gear 18 should fail to mesh with the teeth of gear 57 or 56, on the forward movement of the carriage, the gears 56 and 57 would slide on shaft 38, against the action of the spring 60, until the rotary movement of gears 17 and 18 causes the gears to intermesh and then the spring 60 would return the gears 56 and 57 to their normal position.

The front end of the hub of the gear 56 is reduced and has spiral teeth 62 thereon and a gear 63 of the same diameter as the toothed part of the gear 56 has spiral internal teeth for engaging the teeth 62. A reduced part of the gear 63 has a groove therein to receive a split ring 64 for operating the arms 65 which have eyes at their upper ends through which the stationary shafts 65'' pass and each arm has a cam 65' at its upper end which are adapted to engage the shoulders 66 on the lower edges of the side parts of the carriage. The shafts 65'' are suitably supported in the casing and are so formed that they will hold the split ring 64 in the groove of the gear 63. Each arm 65 has a pin and slot connection with the ring 64.

A member 67 has internal spiral teeth for meshing with the teeth 12 on the part 10 to gear 7 and said member 67 has a flange 68 having internal spiral teeth for engaging the teeth of the clutch part 19. This member 67 also has an annular groove therein for receiving the fork 69 for operating the cam carrying members 70, the cams of which engage the rear end of the carriage as will be hereinafter described. These cams are shown at 70' and the members 70 are rotatably supported by the shaft 70.

The driven shaft 6 passes through a tubular part 71 attached to the rear end of the casing and contains the anti-friction bearings 72 and the roller bearings 73 for the shaft 6. An adjusting member 74 is threaded in this tubular member 71 and is held in adjusting position by the locking member 75 passing through a hole in the tubular member 71 for engaging teeth 76 on the member 74. By removing the part 75 and adjusting the member 74, the bearings 14, 24, 15 and 73 will be adjusted at the same time.

It will be seen that the springs 26 tend to hold the carriage and the shaft 16 in the position shown in Figure 2, which is the high speed position, and also the position of the parts when the car is idle. It will also be seen that in this position of the parts, the rollers of the arms 31 of the shaft 30 will be engaging the recesses 21' in the forward end of the carriage, due to the action of the spring 35, which is connected with the arm 33 of said shaft 30. Thus this spring 35, acting with the springs 26, will hold the parts in the position shown in Figure 2.

Thus, starting with the car idle, the clutch part 19 will be in mesh with the internal clutch part 11 of shaft 6 and the gears 17 and 18 being, of course, out of mesh with the gears 57 and 56. After starting the engine the operator shifts the lever 55 to move the clutch 20 into engagement with the clutch teeth 5 so as to connect the shaft 13 to the drive shaft 3. The rotation of this shaft 13 will of course rotate the power shaft 16 and the clutch part 19 will tend to rotate the shaft 6 but if the load on the shaft 6 is greater than the resistance offered by the springs 26 and the spring connected with shaft 30, the spiral clutch part 19 will unscrew itself from the spiral teeth 11, so that the hollow shaft 16 will be moved forwardly, carrying the gears and the carriage with it, the carriage moving against the spring action of the spring anchored to the shaft 30 and the springs 26. This movement will continue until the gear 18 comes into mesh with the gear 56 and then if the resistance is still too great to produce a rotary movement of the shaft 6, from the counter shaft through gears 56, 40 and 7, the forward movement will continue until the low gear 17 comes into mesh with the gear 57.

Figure 6:
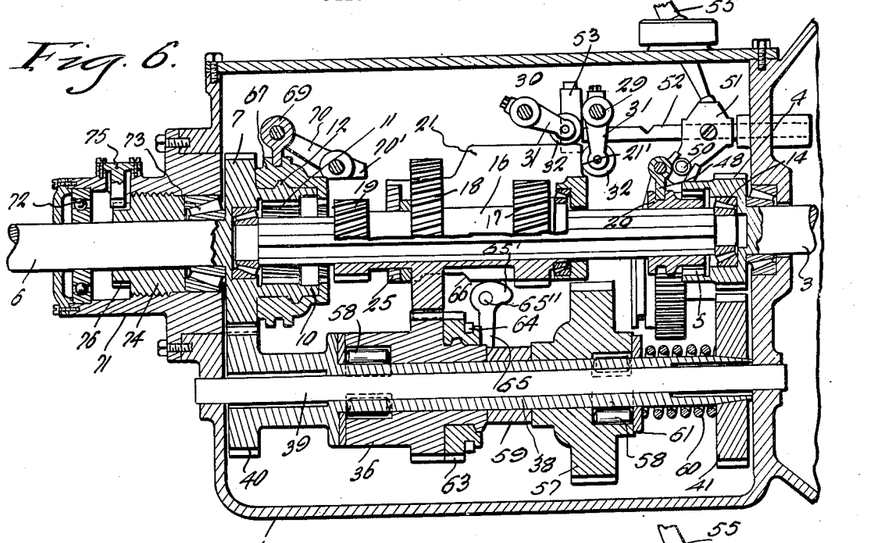
Figure 6 is a view similar to Figure 2, but showing the parts in second speed position.
Figure 7:
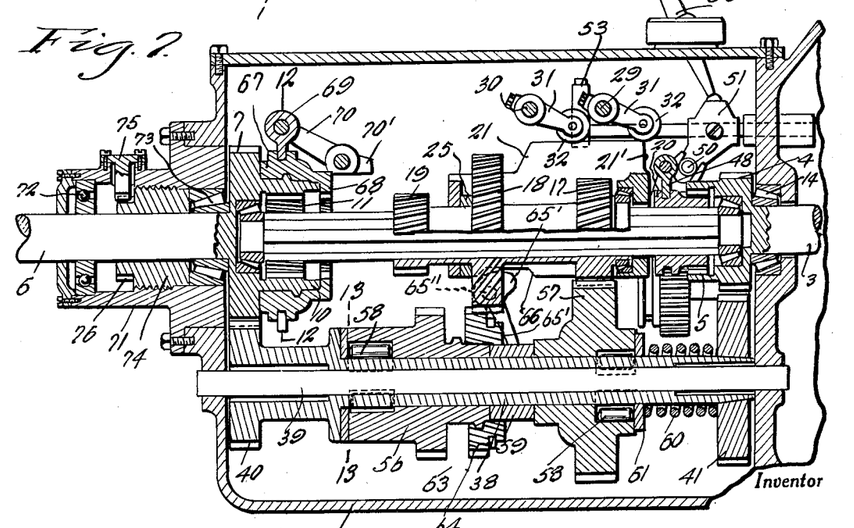
Figure 7 is a similar view, but showing the parts in low speed position.
Figures 8, 15:
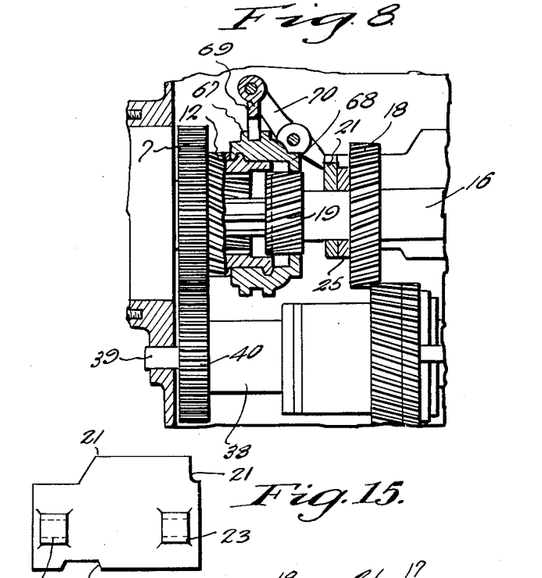
Figure 8 is a side view showing the carriage held by the cam means and just before the parts move into high speed position.
Figure 15 is a side view of the carriage.
Figures 9, 11:
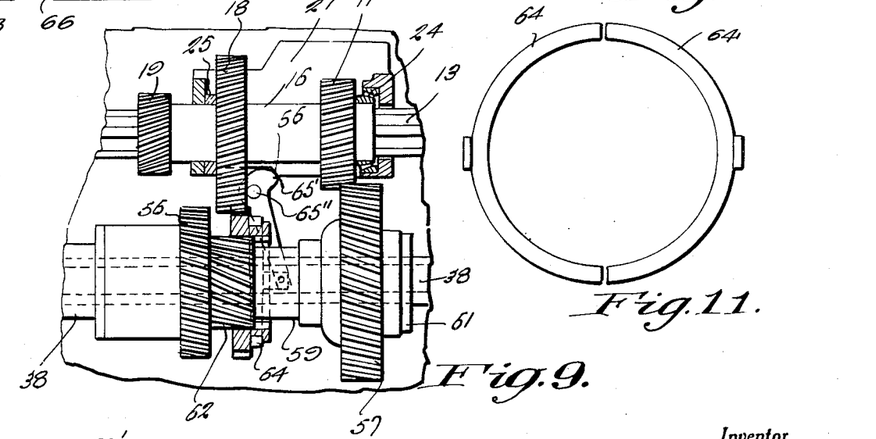
Figure 9 is a side view showing the carriage held by the other cam means before moving into second speed position.
Figure 11 is a view of the ring which is carried by the cam operated gear associated with the intermediate gear of the counter shaft.
Figure 10:
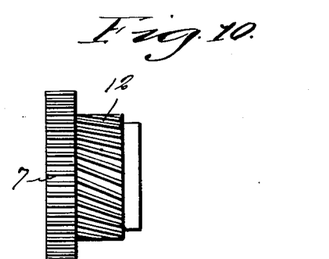
Figure 10 is a view of the gear member which is carried by the driven shaft.
Figure 12:
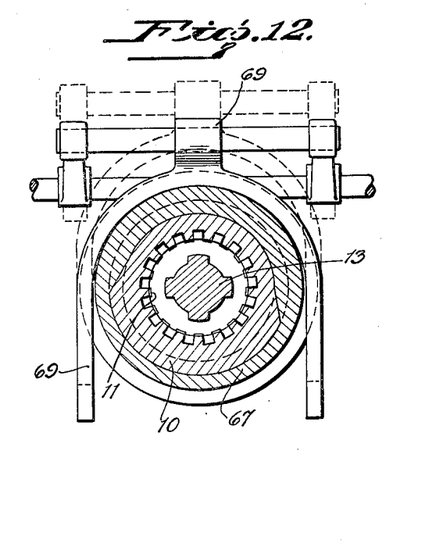
Figure 12 is a section on line 12—12 of Figure 7.

As will be seen from Figure 6, which shows the parts in second speed position, before the carriage and shaft 16 will move from second speed to first or low speed, the load on the driven shaft 6 must be greater than the resistance offered by the springs 26 and the spring 35 connected with the shaft 29, for in this position of the parts, the spring 35 of shaft 29 will cause the rollers of the arms 31 of said shaft 29 to bear against the forward end of the carriage and thus this spring 35 of shaft 29 will help the springs 26 to resist forward movement of the carriage from second speed to low speed. When the rollers of the arms of these shafts 29 and 30 contact the top of the carriage, as shown in Figure 7, they will offer but little resistance to the movement of the carriage. This Figure 7 shows the parts in low speed position.

Further forward movement of the carriage after it reaches low speed position is prevented by its engagement with the tubular stop members 28 so that the gear 17 will rotate the gear 57 and the overrun clutch means 58 of this gear 57 will rotate the counter shaft and thus drive the shaft 6 through the gears 40 and 7, so that the vehicle will start to move at low speed. After the desired speed is attained, the operator partly closes the throttle for an instant, so as to allow the carriage to move rearwardly under the action of the springs 26 to return the clutch part 19 into mesh with the internal teeth 11 of the part 10. The operator then opens the throttle and if the resistance of the load on shaft 6 is still too great for the shaft 6 to be driven at high speed, the carriage will move forwardly again until the intermediate gears 18 and 56 are in mesh.

As the vehicle is moving the resistance of the load will not be as great as the resistance offered to the movement of the carriage by the spring pressed arms 31 of shaft 29 and springs 26, so that the vehicle will be driven at an intermediate speed through the gears 18 and 56, the counter shaft and gears 40 and 7. After the speed desired has been obtained, in intermediate speed, the operator again closes the throttle so as to allow clutch part 19 to again mesh with the teeth 11 and as the load on shaft 6 has been reduced by the speed obtained by the intermediate gears, clutch part 19 will remain in mesh with the teeth 11, so that the vehicle is then driven at high speed.

If a resistance is met, such as the vehicle starting up a hill, the carriage will automatically move forwardly without help from the operator, so that the intermediate gears will move into mesh, and then as the vehicle picks up speed, the carriage returns to its rearmost position to place the parts in high speed position.

The overrun clutches 58 of the gears 56 and 57 enable the gears 17 and 18 to move into and out of mesh with said gears 57 and 56 without clashing.

It will be seen that when the load on shaft 6 is greater than the resistance offered by the springs which hold the carriage in its rearward position, the clutch 19 will move off the clutch 11, but before it leaves the clutch 11, the gear 18 will start to mesh with the gear 56 and if the load on shaft 6 is still too great to permit the motor to drive the shaft 6 through the gears 18 and 56, then the gear 18 will move off the gear 56 and cause the gear 17 to mesh with the gear 57, said gear 17 moving into mesh with the gear 57 before the gear 18 moves off the gear 56.

As the gear 18 moves off the gear 56 to move the gear 17 into mesh with gear 57, said gear 18 will move onto the gear 63 and as said gear 18 is rotating faster than the gear 56, the gear 63 will unscrew itself from the reduced spiral gear 62 and move with the gear 18 toward the front end of the device. This forward movement of the gear 63 will swing the cams 65' upwardly and as said cams move upwardly, they will engage the inclined shoulders 66 on the carriage and thus tend to move the carriage forwardly so that the cams will contribute to the forward motion of the carriage. When the gear 17 is in full mesh with the gear 57 and forward motion of the carriage has been stopped by its engagement with the stops 28, the shoulders 66 are spaced from the cams 65', which are still held in raised position.

Then, as the resistance of the shaft 6, which is being driven at low speed through the low speed gears 17 and 57, becomes less than the pressure of the springs 26 and the spring connected with the shaft 29, said springs will move the carriage rearwardly to place the gear 18 in mesh with the gear 56. As the gear 18 moves rearwardly, the gear 63 will move with said gear 18 and thus wind itself upon the gear 62 and this movement of the gear 63 is helped by the shoulders 66 striking the cams 65', which, through the cam action between said shoulders and cams, tend to swing the arms 65 downwardly and rearwardly. Thus the gear 18 will move into mesh with the gear 56 to rotate the shaft 6 at intermediate speed. However, if the gear 18 should be rotating at such a high speed as to cause it to clash with the gear 56, the gear 63 would be rotated at the same speed as the gear 18 and thus the arms 65 will be held in raised position and the cams 65' would thus be engaged by the shoulders 66 so that rearward movement of the carriage would stop as the cams 65' and the shoulders 66 would prevent further rearward movement of the carriage. The operator then has to partly close the throttle to reduce the speed of the gear 18 to a speed about equal to or slightly less than that of the gear 56 so that the gear 63 will move back on the gear 62 and thus lower the arms 65 to move the cams 65' out of the path of the shoulders 66. Then the carriage can move rearwardly and the gear 18 will move into mesh with the gear 56, so that the car will be driven in intermediate speed. The operator will know when it is necessary to partly close the throttle by a slight grinding sound that is produced when the gear 63 (which has completely unscrewed itself from the clutch 62) is again endeavoring to mesh with the clutch 62.

If the shaft 16 and the clutch part 19 are revolving so fast as to cause the clutch part 19 to clash with the clutch part 11, the engagement of the clutch part 19 with the teeth of the flange 68 will cause the member 67 to move forwardly on the spiral 12 and thus the members 70 will be moved to a position to cause the cams 70' to move downwardly into the path of the carriage and by engaging the rear end of the carriage will prevent further rearward movement of the carriage. The operator would then partly close his throttle to reduce the speed of the shaft 16 and clutch part 19, so that the member 67 will move back upon the part 12 and the clutch part 19 will move into engagement with the clutch part 11 to connect the shafts 13 and 16 with the driven shaft 6, rearward movement of the member 67 moving the members 70 to a position where the cams 70' will be out of the way of the carriage.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. In a device of the class described, a drive shaft, a driven shaft, a counter shaft geared to the driven shaft, a hollow shaft, a splined shaft on which the hollow shaft is supported for sliding movement thereon and for rotary movement therewith, clutch means for connecting the splined shaft with the drive shaft, spiral gears of different sizes on the hollow shaft, spiral gears of different sizes on the counter shaft for meshing with the gears of the hollow shaft, a clutch part having spiral teeth, on the hollow shaft, a clutch part, having spiral teeth, connected with the driven shaft, and spring means for normally holding the clutch parts in engagement, said spring means yielding to permit longitudinal movement of the hollow shaft when the load on the driven shaft causes the clutch part on the hollow shaft to unscrew from the clutch part of the driven shaft whereby a gear on the hollow shaft will mesh with the companion gear on the countershaft.

2. In a device of the class described, a drive shaft, a driven shaft, a counter shaft geared to the driven shaft, a hollow shaft, a splined shaft on which the hollow shaft is supported for sliding movement thereon and for rotary movement therewith, clutch means for connecting the splined shaft with the drive shaft, spiral gears of different sizes on the hollow shaft, spiral gears of different sizes on the counter shaft for meshing with the gears of the hollow shaft, a clutch part having spiral teeth on the hollow shaft, a clutch part having spiral teeth, connected with the driven shaft, spring means for normally holding the clutch parts in engagement, said spring means yielding to permit longitudinal movement of the hollow shaft when the load on the driven shaft causes the clutch part on the hollow shaft to unscrew from the clutch part of the driven shaft whereby a gear on the hollow shaft will mesh with the companion gear on the countershaft, a carriage connected with the hollow shaft, means actuated by an intermediate gear of the hollow shaft for holding the carriage in an intermediate position, with said intermediate gear out of mesh with its companion gear when the drive shaft and hollow shaft are rotated at too great a speed to permit proper meshing of the intermediate gear with its companion gear on the counter shaft, said holding means moving to inoperative position when the speed of the hollow shaft is reduced, and means for holding the carriage in a position to prevent engagement of the clutch part of the hollow shaft with the clutch part of the driven shaft when the hollow shaft is rotating at too great a speed to permit proper mesh of one clutch part with the other, said last mentioned holding means moving to inoperative position when the speed of the hollow shaft is reduced.

3. In a device of the class described, a drive shaft, a driven shaft, a splined shaft in alinement with the said shafts but supported for independent rotation, clutch means for connecting the splined shaft to the drive shaft, a hollow shaft supported on the splined shaft for sliding movement thereon and for rotary movement therewith, spiral gears of different sizes carried by the hollow shaft, a counter shaft geared to the driven shaft, spiral gears of different sizes carried by the counter shaft for meshing with the gears of the hollow shaft, a clutch member, having spiral teeth thereon, connected with the hollow shaft, a clutch member, having spiral teeth, connected with the driven shaft, a carriage associated with the hollow shaft, spring means engaging the carriage for normally holding the carriage in a position with the hollow shaft in a position with its clutch part engaging the clutch part of the driven shaft, spring actuated means for helping the spring means to hold the carriage in a position with the two clutch parts in engagement, spring actuated means for holding the first mentioned spring means to hold the carriage in a position to permit an intermediate gear of the hollow shaft to mesh with its companion gear on the counter shaft.

4. In a device of the class described, a drive shaft, a driven shaft in alinement therewith, a splined shaft in alinement with the said shafts and supported for independent rotation, clutch means for connecting the splined shaft to the drive shaft, a hollow shaft on the splined shaft and supported for sliding movement thereon and for rotary movement therewith, spiral gears of different sizes carried by the hollow shaft, a counter shaft geared to the driven shaft, spiral gears of different sizes carried by the counter shaft for meshing with the gears of the hollow shaft, a clutch member, having spiral teeth, connected with the driven shaft, a clutch member having spiral teeth connected with the hollow shaft, a carriage associated with the hollow shaft, spring means engaging the carriage for normally holding the carriage in a position with the hollow shaft in a position with its clutch part engaging the clutch part of the driven shaft, spring actuated means for helping the spring means to hold the carriage in a position with the two clutch parts in engagement, spring actuated means for helping the first-mentioned spring means to hold the carriage in a position to permit an intermediate gear of the hollow shaft to mesh with its companion gear on the counter shaft, clutch means for each said gears of the counter shaft for connecting the gears with the shaft when the gear is rotated in one direction and releasing the gears from the shaft when the gear is rotated in an opposite direction.

5. In a device of the class described, a drive shaft, a driven shaft in alinement therewith, a splined shaft in alinement with the said shafts and supported for independent rotation, clutch means for connecting the splined shaft to the drive shaft, a hollow shaft on the splined shaft and supported for sliding movement thereon and for rotary movement therewith, spiral gears of different sizes carried by the hollow shaft, a counter shaft geared to the driven shaft, spiral gears of different sizes carried by the counter shaft and meshing with the gears of the hollow shaft, a clutch member, having spiral teeth, connected with the driven shaft, a clutch member having spiral teeth connected with the hollow shaft, a carriage associated with the hollow shaft, spring means engaging the carriage for normally holding the carriage in a position with the hollow shaft in a position with its clutch part engaging the clutch part of the driven shaft, spring actuated means for helping the spring means to hold the carriage in a position with the two clutch parts in engagement, spring actuated means for helping the first-mentioned spring means to hold the carriage in a position to permit an intermediate gear of the hollow shaft to mesh with its companion gear on the counter shaft, clutch means for connecting the said spiral gears of the counter shaft when the gears are rotated in one direction and releasing the gears from the shaft when the gears are rotated in an opposite direction, means actuated by said intermediate gear of the hollow shaft for holding the carriage in an intermediate position with said intermediate gear out of mesh with its companion gear when the drive shaft and hollow shaft are rotating at too great a speed to permit proper meshing of said intermediate gear with its companion gear on the counter shaft, said holding means moving to inoperative position if the speed of the hollow shaft is reduced, and means for holding the carriage in a position to prevent engagement of the clutch member of the hollow shaft with the clutch member of the driven shaft when the hollow shaft is rotating at too great a speed to permit proper mesh of one clutch part with the other, said last mentioned holding means moving to inoperative position when the speed of the hollow shaft is reduced.

FREDERICK SLAVEK.